3,218,150
COMPLEX FERTILIZERS OF POTASSIUM TRIPOLYPHOSPHATE BASE
Philippe Jean-Baptiste Gautier, Nanterre, and Marguerite Provoost, Paris, France, assignors to Produits Chimiques Pechiney Saint-Gobain, Neuilly-sur-Seine, France
No Drawing. Original application Apr. 25, 1961, Ser. No. 105,300, now Patent No. 3,193,374. Divided and this application Apr. 21, 1964, Ser. No. 361,576
Claims priority, application France, Apr. 27, 1960, 825,469
6 Claims. (Cl. 71—51)

This application is a division of our copending application, Serial No. 105,300, filed April 25, 1961, now Patent No. 3,193,374. This invention relates to complex fertilizers having a base of potassium tripolyphosphate and containing the three fertilizing elements, nitrogen, potassium and phosphorous.

It is known that one may produce from compositions of phosphoric acid complete fertilizers containing these three elements, but that such fertilizers have heretofore scarcely exceeded 60% of them.

It is also known that potassium tripolyphosphate constitutes a fertilizer having a high content of $K_2O$ and $P_2O_5$ and that of the total 100% of fertilizing elements 52.5% is $K_2O$ and 47.5% is $P_2O_5$, when the fertilizer is prepared from pure phosphoric acid, and that this fertilizer is substantially totally soluble in natural water. At the same time the use of such fertilizer is difficult, if not impossible, because of its great hygroscopicity which causes it to lump together during storage.

It is an object of this invention to make new fertilizers containing the three elements N, P and K which contain at least 75% of fertilizing elements and being highly soluble in water while at the same time lacking hygroscopicity. These new products have been made by the process hereinafter described.

In the preferred form of the invention the potassium tripolyphosphate used in the preparation of the fertilizer should be made from phosphoric acid which has itself been made by the wet way, and which may advantageously contain trace elements as impurities such as magnesium, copper and manganese which are beneficial to the soil in small amounts. The potassium tripolyphosphate is advantageously prepared by adding to phosphoric acid some potassium carbonate or, preferably, potassium hydroxide in concentrated solution, the proportions being such as to establish the ratio of potassium to phosphorous of 5 to 3. The fixing of this ratio may advantageously be precise and can be established by the use of a pH meter, the solution of potassium hydroxide being added to the phosphoric acid until the pH reaches 6.8 at which level the addition ceases. The solution thus prepared is dried, the product obtained by drying is put in a furnace at 200° C. for ½ hour, and thereafter the temperature is raised to 400° C. for 1 hour to produce the condensation to tripolyphosphate. The tripolyphosphate drawn from the furnace contains much higher, insoluble polyphosphates detectable by chromatographic analysis and has the following approximate composition:

| | Percent |
|---|---|
| $P_2O_5$, total | 46.2 |
| Water soluble $P_2O_5$ | 44.5 |
| Water soluble $K_2O$ | 47.2 |

This potassium tripolyphosphate is hygroscopic and contains 93.4% of fertilizing elements of which 91.7% are soluble in water.

In preparing the new product the potassium tripolyphosphate above described is moistened with phosphoric acid of medium concentration, for instance containing about 30% $P_2O_5$, and is granulated by the methods which are customarily used for granulation in an atmosphere of ammonia. The ammoniation is carried on until the formation of diammonium phosphate begins, at which time the ammoniation is terminated and a phosphate having the following composition is obtained:

| | Percent |
|---|---|
| Total $P_2O_5$ | 42.6 |
| Water soluble $P_2O_5$ | 41.9 |
| Water soluble $K_2O$ | 33 |
| Ammoniacal nitrogen | 2.9 | constituting a total of 78.5% of fertilizing elements of which 77.8% are soluble in water. Consequently this fertilizer contains the three fertilizing elements in very high percentage.

If it is desired to still further increase the content of nitrogen one may add to this fertilizer a fertilizer having high nitrogen content such as urea or diammonium phosphate. The operation is carried out as described above, that is to say potassium tripolyphosphate is mixed with the selected nitrogenous fertilizer, the mixture is moistened with phosphoric acid and the granulator is supplied with a slow current of ammonia. There is thus produced a complex fertilizer which is not hygroscopic and which contains 83% to 88% of fertilizing elements of which a very high proportion is soluble in water.

The following examples also illustrate the invention:

*Example A*

To 52 parts of potassium tripolyphosphate by weight containing 52.5% $K_2O$ and 47.5% $P_2O_5$ there are added 43 parts of diammonium phosphate having a ratio of N to P about 1.5. The mixture is moistened with 10 parts of phosphoric acid containing 30% $P_2O_5$ by weight and granulation is carried out in the usual apparatus and under the usual conditions in the presence of an atmosphere containing a substantial proportion of ammonia, 1.7 parts by weight of nitrogen were fixed as $NH_3$ (2.07 parts $NH_3$) in the ammoniation step. The fertilizer thus obtained has the composition:

| | Percent |
|---|---|
| Total $P_2O_5$ | 51.2 |
| Water soluble $P_2O_5$ | 50.7 |
| Assimilable $P_2O_5$ | 51 |
| Water soluble $K_2O$ | 27 |
| Ammoniacal nitrogen | 8.8 |

This adds up to a total of 87% of fertilizing elements of which 86.5% are water soluble. The fertilizer was granular, and contained 8.8% of ammoniacal nitrogen, 51.2% anhydrous $P_2O_5$, and 27% anhydrous $K_2O$.

*Example B*

Mix 76 parts of potassium tripolyphosphate containing 52.5% $K_2O$ and 47.5% $P_2O_5$, and 20 parts of urea, in place of ammonium phosphate, then proceed as in Example A using 21.5 parts of phosphoric acid containing 30% $P_2O_5$. 1.2 parts of ammonia were fixed from an ammonia atmosphere in the granulator. The fertilizer obtained contains:

| | Percent |
|---|---|
| Total $P_2O_5$ | 38.2 |
| Water soluble $P_2O_5$ | 37.4 |
| Assimilable $P_2O_5$ | 37.8 |
| Water soluble $K_2O$ | 36 |
| Total nitrogen | 9.4 |

This adds up to 83.6% of fertilizing elements of which 82.8% are water soluble.

Field tests have been made following the methods of Neubauer and the new products have been tested for absorption by barley plants. In comparison to barley plants treated by the classical fertilizers, calcium nitrate, superphosphate, and potassium chloride, the new fertilizers showed excellent assimilability of the $P_2O_5$ and the $K_2O$ and provided by the potassium tripolyphosphate, the assimilability of phosphorous and potassium being the same for the new products as for the fertilizers of superphosphate and potassium chloride, when used in equal quantities and standard doses. The new fertilizers may be used in all spring and fall plantings either by incorporation in the soil, by pulverization with mulch or in water of irrigation.

These products are much superior to those prior art fertilizers made from phosphoric acid which were complete in N, P and K, particularly in that they contain a much higher content of the three elements, being on the order of 75% or more as compared to the approximate maximum of 60% attained by the prior art product.

As many apparently widely different embodiments of the present invention may be made without departing from the spirit and scope thereof, it is to be understood that the invention is not limited to the specific embodiments.

What is claimed is:

1. A granulated non-hygroscopic fertilizer containing tripolyphosphate of potassium and ammoniacal nitrogen, in which water soluble $P_2O_5$ and $K_2O$ are present in major amounts, up to about 51% $P_2O_5$ and 36% $K_2O$ by weight, and N is present in a minor amount and in which more than 60% of the elements P, K and N are in a form assimilable by plants and soluble in water.

2. A granulated non-hygroscopic fertilizer containing tripolyphosphate of potassium and ammoniacal nitrogen in which $P_2O_5$ and water soluble $K_2O$ are present in major amounts, up to about 51% $P_2O_5$ and 36% water soluble $K_2O$ by weight, and N is present in a minor amount, which is substantially free of insoluble $P_2O_5$, and in which more than 75% of the elements P, K and N are in a form assimilable by plants and soluble in water.

3. A granulated non-hygroscopic fertilizer containing tripolyphosphate of potassium and ammoniacal nitrogen in which $P_2O_5$ and water soluble $K_2O$ are present in major amounts, $P_2O_5$ being present in an amount from about 38% to about 51% by weight, water soluble $K_2O$ being present in an amount from about 27% to about 36% by weight, said fertilizer being substantially free of insoluble $P_2O_5$ and substantially more than 60% of the P, K and N being present in a form assimilable by plants and soluble in water.

4. The fertilizer of claim 3 having by weight percent

| | Percent |
|---|---|
| total $P_2O_5$ | About 42.6 |
| water soluble $P_2O_5$ | About 41.9 |
| water soluble $K_2O$ | About 33 |
| ammoniacal N | About 2.9 |

5. The fertilizer of claim 3 having by weight percent

| | Percent |
|---|---|
| total $P_2O_5$ | About 51.2 |
| water soluble $P_2O_5$ | About 50.7 |
| assimilable $P_2O_5$ | About 51 |
| water soluble $K_2O$ | About 27 |
| ammoniacal N | About 8.8 |

6. The fertilizer of claim 3 having by weight percent

| | Percent |
|---|---|
| total $P_2O_5$ | About 38.2 |
| water soluble $P_2O_5$ | About 37.4 |
| assimilable $P_2O_5$ | About 37.8 |
| water soluble $K_2O$ | About 36 |
| total N | About 9.4 |

References Cited by the Examiner

UNITED STATES PATENTS

| 2,174,614 | 10/1939 | Bornemann | 23—106 |
| 2,288,418 | 6/1942 | Partridge | 23—106 |
| 2,867,504 | 1/1959 | Semmens | 23—106 |

DONALL H. SYLVESTER, *Primary Examiner.*

ANTHONY SCIAMANNA, *Examiner.*